F. MOENCH.
POLE SOCKET.
APPLICATION FILED JUNE 8, 1908.
902,673.
Patented Nov. 3, 1908.
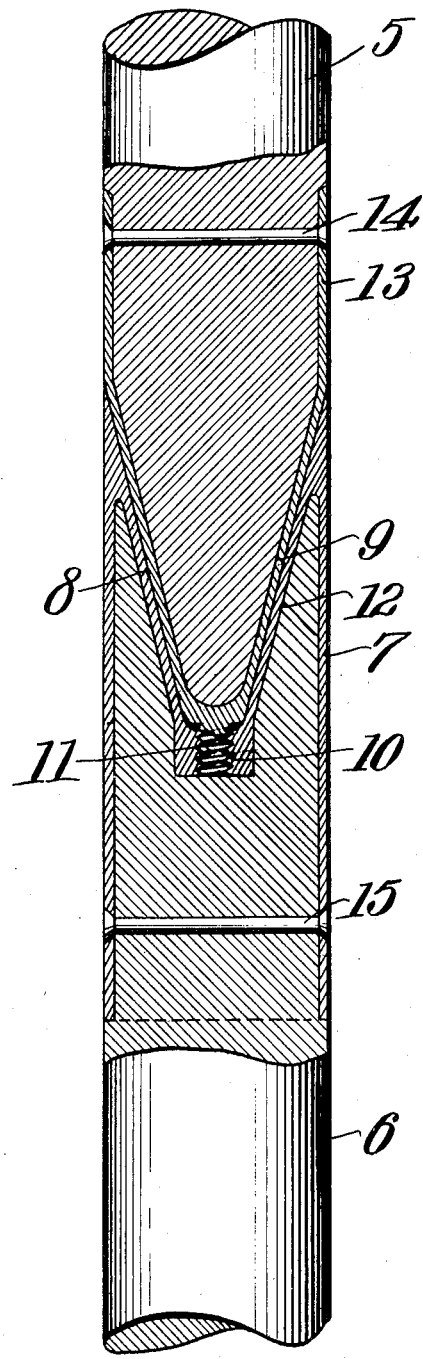
Fig. 1.
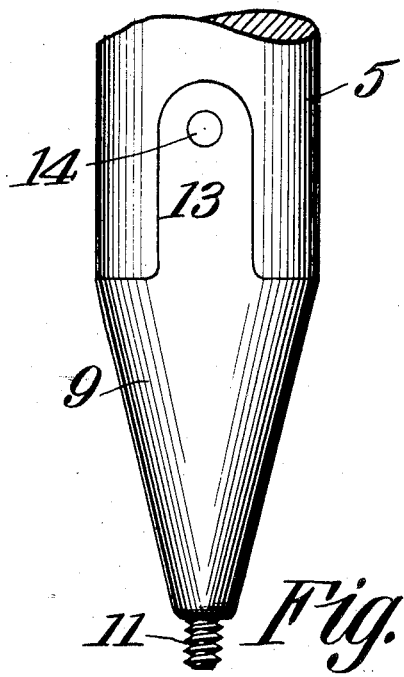
Fig. 2.
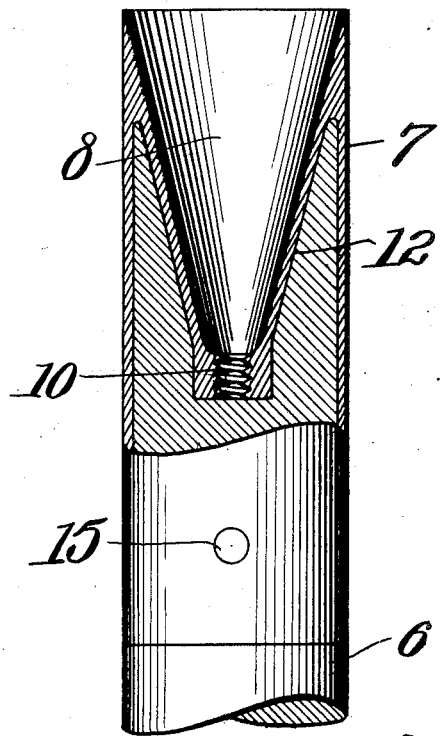
Witnesses,
Inventor,
Frederick Moench,
By C. A. Snow & Co.
Attorneys.

UNITED STATES PATENT OFFICE.

FREDERICK MOENCH, OF LESUEUR CENTER, MINNESOTA.

POLE-SOCKET.

No. 902,673.     Specification of Letters Patent.     Patented Nov. 3, 1908.

Application filed June 8, 1908.  Serial No. 437,436.

*To all whom it may concern:*

Be it known that I, FREDERICK MOENCH, a citizen of the United States, residing at Lesueur Center, in the county of Lesueur and State of Minnesota, have invented a new and useful Pole-Socket, of which the following is a specification.

This invention relates to rod couplings and has for its object to provide a comparatively simple and inexpensive device of this character for connecting adjacent sections of rods, poles and the like.

A further object of the invention is to provide a rod coupling including a socket member designed for attachment to one section of a rod or pole and having inclined or tapered walls for engagement with a correspondingly tapered shank or ferrule secured to the mating rod section, said socket and ferrule having interengaging parts, thereby to lock the rod sections in coupled position.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Figure 1 is a longitudinal sectional view of a rod coupling constructed in accordance with my invention. Fig. 2 is a side elevation of the members comprising the coupling detached, one of the members being shown partly in section.

Similar numerals of reference indicate corresponding parts in all of the figures of the drawings.

The improved coupling forming the subject matter of the present invention is principally designed for uniting adjacent sections of rods, poles and the like and by way of illustration is shown applied to an extensible rod or pole in which 5 designates one section and 6 the mating section.

The device consists of a casing 7 preferably cylindrical in shape, as shown, and embedded in the exterior walls of the section 6, the metal forming one end of the member 7 being extended downwardly within the same to form a socket 8, the walls of which are inclined or beveled for engagement with a correspondingly tapered shank or ferrule 9 secured to the adjacent end of the mating rod section 5.

The socket 8 is provided at its reduced end with a terminal neck the interior walls of which are threaded at 10 for engagement with a correspondingly threaded extension 11 carried by the ferrule or shank 9, there being a recess 12 formed in the rod section 6 for the reception of the socket piece 8, as shown. The ferrule 9 is provided with longitudinally disposed attaching arms 13, which latter are preferably embedded in the exterior walls of the rod section 5 and permanently secured thereto, in any suitable manner, as by rivets or similar fastening devices 14, there being similar fastening devices 15 employed for securing the casing 7 in position on the rod section 6. It will thus be seen that when the ferrule is inserted in the socket 8 and either rod section rotated the threads on the extension 11 will engage the threaded walls of the socket and thus draw the rod sections together, the socket and ferrule forming in effect a wedge thereby to effectually prevent accidental separation of said rod sections.

The coupling or joint may be employed for connecting adjacent sections of sucker rods, tent poles, fishing poles, shafting and the like, or wherever a device of this character is found desirable or applicable.

Having thus described the invention what is claimed is:

A rod coupling including mating sections, one of which is provided with a recess and the other with a tapered portion, a casing surrounding the recessed rod section and provided with a socket extending within the recess and having inclined walls, the small end of the socket member being provided with an integral thickened portion having an aperture therein the walls of which are threaded, a conical shaped ferrule forming a housing for the tapered end of the mating section and provided with longitudinally disposed attaching arms for engagement with said mating section, and a threaded extension projecting longitudinally from one end of the ferrule and adapted to engage the threaded walls of the aperture in said thickened portion.

In testimony that I claim the foregoing as my own, I have hereto affixed my signature in the presence of two witnesses.

FREDERICK MOENCH.

Witnesses:
JOSEPH HAGERTY,
H. KEWITSCH.